United States Patent
Blomgren et al.

(10) Patent No.: US 8,982,824 B2
(45) Date of Patent: Mar. 17, 2015

(54) METHOD AND A DEVICE FOR INCREASED BIT RATE

(75) Inventors: Mats Blomgren, Stockholm (SE); Jan Christoffersson, Luleå (SE); Mårten Ericson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 13/699,828

(22) PCT Filed: May 26, 2010

(86) PCT No.: PCT/SE2010/050566
§ 371 (c)(1), (2), (4) Date: Nov. 26, 2012

(87) PCT Pub. No.: WO2011/149391
PCT Pub. Date: Dec. 1, 2011

(65) Prior Publication Data
US 2013/0070683 A1  Mar. 21, 2013

(51) Int. Cl.
*H04W 28/00* (2009.01)
*H04W 28/06* (2009.01)
*H04W 28/10* (2009.01)
*H04W 72/12* (2009.01)

(52) U.S. Cl.
CPC ............ *H04W 28/065* (2013.01); *H04W 28/10* (2013.01); *H04W 72/1205* (2013.01)
USPC ............................ 370/329; 370/341; 370/392

(58) Field of Classification Search
None
See application file for complete search history.

(56) References Cited

U.S. PATENT DOCUMENTS

| 6,628,956 | B2 | 9/2003 | Bark |
| 2007/0073895 | A1* | 3/2007 | Sebire et al. ................... 709/230 |
| 2007/0213035 | A1* | 9/2007 | Sebire et al. ............... 455/414.1 |
| 2009/0316639 | A1* | 12/2009 | Marinier et al. .............. 370/329 |
| 2012/0120886 | A1* | 5/2012 | He et al. ........................ 370/329 |
| 2012/0281571 | A1* | 11/2012 | Marinier et al. .............. 370/252 |
| 2014/0036884 | A1* | 2/2014 | Terry ............................ 370/336 |

* cited by examiner

*Primary Examiner* — Duc Duong

(57) ABSTRACT

In a method and a device for setting the Transport Format Combination size step in a scheduler of a cellular radio system to be used by a user equipment transmitting data to a radio base station of the cellular radio system, the Transport Format Combination size step is set as a function of a number of pre-defined cell and/or user conditions. This will increase the user bit Crate at low load. Specifically, the time to reach a high bitrate in low load situations is reduced. This leads to enhanced user experience for bursty services such as World Wide Web (WWW) services.

16 Claims, 2 Drawing Sheets

METHOD AND A DEVICE FOR INCREASED BIT RATE

TECHNICAL FIELD

The present invention relates to a method and a device for increasing the bit rate in a cellular radio system. In particular the invention relates to a method and a device for setting the TFC size step in a cellular radio system.

BACKGROUND

High Speed Packet Access (HSPA) is a technology used for data traffic in mobile communication systems. With HSPA it is now become possible to provide mobile broadband services since the peak bit rates reach up to 42 Mbps in Third Generation Partnership Project Release 8 (3GPP R8) for the downlink, and 11 Mbps (3GPP R8) in the uplink. For 3GPP R9 the peak rates are doubled. Bit rates of this magnitude are sufficient for many applications and can provide good user experience. However, these figures only represent part of what the user will experience when using these systems.

A common traffic type for internet connections is so-called bursty traffic, i.e. traffic having very high peak loads interrupted by periods with low or now load. Bursty traffic is for example common for many types of WWW sessions and uploads of small files. In these situations the user will never reach the above mentioned bitrates because in many situations rather slow ramp up period of the user's bit rate, i.e. user's Transport format is slowly increased. The reason for having a rather restrictive transport format ramp up is to ensure the system stability. If a too fast transport format ramp up, possibly from more than one user simultaneously, may create a high noise rise peak, which in turn will have a negative impact on coverage and capacity.

In existing HSPA systems noise rise is the limiting resource in the uplink. The system strives to utilize as much as possible of the allowable noise rise by increasing the Transport Format Combination (TFC) which in turn limits the maximum bit rate a UE can utilize for the active users in a controlled matter until it reaches the noise rise limit. If the noise rise limit is exceeded, the system will decrease the TFCs depending on how severe the noise rise peak is.

There is a constant need to improve the performance in mobile communication system. Hence, there exists a need for improving transmission of data traffic in a mobile communication system.

SUMMARY

It is an object of the present invention to overcome or at least reduce some of the problems associated with the above.

The above object and others are obtained by the method and apparatus as set out in the appended claims.

The inventors have realized that the existing method for increasing and decreasing the TFC in a cellular radio system, in particular a HSPA system, is designed to work in all load situations without leading to unstable system performance. The price for generality is sub optimal performance in certain situations. In particular when there are few users and low system load, the increase of the TFC is too moderate to be optimal.

The slow increase of TFC in combination with few users and small to medium file sizes lead to that much of the data is transmitted using low TFC (i.e. with low data rate) and when the TFC begin to reach their optimal level noise rise limit reached, the file is already transmitted. Hence, the data rate never reaches its possible maximum level. This is the case for the common traffic type World Wide Web (WWW) services.

Thus, the TFC size is stepped up at an increased rate when certain conditions are fulfilled. In particular the conditions are set to identify situations when an increased step up rate is determined to not reduce the performance of other users and/or risk the stability of the system. A number of conditions can be used, either by themselves or in combination. In general the conditions relate to the user equipment transmitting with low transmission power and/or that the cell conditions are such that the user equipment does not need to consider the impact on other user equipments or at least is determined to need to show less consideration than in normal conditions. As a result the TFC size step is set as a function of cell and/or user conditions.

In accordance with one embodiment a method of setting the Transport Format Combination size step in a scheduler of a cellular radio system to be used by a user equipment transmitting data to a radio base station of the cellular radio system is provided. The method can comprise setting the Transport Format Combination size step as a function of a number of pre-defined cell and/or user conditions.

In accordance with one embodiment the condition is a condition related to measurements and /or conditions related to the cell in which the user equipment is served.

In accordance with one embodiment the condition is one or many of: Number of M users in the serving cell, Number of scheduled/transmitting users in the serving cell per Transmission Time Interval, Scheduling headroom, Noise rise measurement, Number of simultaneously transmitting users each Transmission Time Interval.

In accordance with one embodiment the condition is a condition relating to measurements and or conditions experienced by the user equipment.

In accordance with one embodiment the condition is one or many of: Power headroom level, Estimated intercell interference impact, Soft handover status, and user equipment buffer level.

In accordance with one embodiment a scheduler for setting the Transport Format Combination size step to be used by a user equipment transmitting data to a radio base station of a cellular radio system is provided. The scheduler is arranged to set the Transport Format Combination size step as a function of a number of pre-defined cell and/or user conditions.

In accordance with one embodiment the condition is that there are few users, a number below a threshold value, in the serving cell and in neighbouring cells. If there are many users in the system, there is always a risk that a fast step up will lead to increased interference and performance loss. The number of users is known to the system and easily monitored.

In accordance with one embodiment the condition is that the user subject to a fast TFC step up is a using low power, below a threshold value. In particular the power can be measured to include power for DPCCH. Low power means that it is possible to increase power a lot without risk of interfering with other users. Low power can be indicated by available power headroom and/or Channel Quality Indicator (CQI) measurements.

In accordance with one embodiment the condition is that there is low noise rise, below a threshold value, in the system. This implies that it is possible to step up TFCs without exceeding the noise rise target. The noise rise can be measured in the radio base station NodeB.

When a condition or a combination of conditions for increased TFC size step is met, the TFC size can be set to increase at an increased rate, leading to higher bitrate for the user(s).

The method steps can in accordance with the invention be provided through the use of dedicated hardware as well as hardware capable of executing software. When provided by a processor, the method steps can be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

Figure 1:
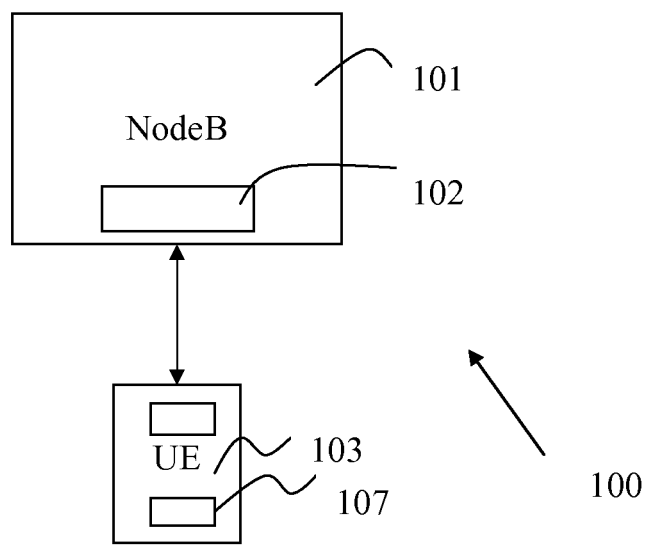
FIG. 1 is a view illustrating a cellular radio system.

The present invention will now be described in more detail by way of non-limiting examples. The exemplary embodiments will for practical reasons be explained in the context of a HSPA system, but the invention is not limited to such a system and can be utilized in any cellular radio system In FIG. 1 a general view of an exemplary cellular radio system 100 is depicted. The system can for example be a HSPA system. The system comprises a number of radio base stations 101, here denoted NodeBs. A mobile station 103, here also denoted User Equipment UE that is in a geographical area covered by the radio base station can connect to the radio base station over an air-interface. The radio base station comprises a module with a scheduler 102 for setting the TFC to be used by a user equipment when transmitting uplink data over the air-interface. While the scheduler 102 is depicted to be located in the radio base station NodeB, it is appreciated that the scheduler can be located in any suitable node of a radio system and adapted to perform the tasks as described herein. The mobile station 103 comprises a module 107 adapted to control the UE to perform functions to be performed. In particular the module 107 can be arranged to adjust the TFC used by the user equipment. The modules 102 and 107 can for example be implemented using a microcontroller operating on a set of computer software instructions stored on a memory in the modules 102 and 107, respectively.

The TFC can be increased depending on several conditions. Formally, the TFC for a user u in cell c can be written as:

$$TFC_{New} = TFC_{Old} + TFCStep(c,u)$$

Where $TFC_{New}$ is the new TFC for user u in cell c, $TFC_{Old}$ is the previous TFC for user u in cell c and TFCStep(c,u) is the step size with which the TFC is increased (or decreased) for user u in cell c. Conventional update procedures use a constant step size, i.e. TFCStep(c,u)=constant.

In accordance with the invention, the TFCStep(c,u) is set to a function of cell and or user conditions. Thus, the condition can be a condition related to measurements and/or conditions related to the cell in which the user equipment is served. The condition can also be a condition relating to measurements and or conditions experienced by the user equipment. The condition can also be a combination of any such conditions. For example, all or a subset of the following conditions can be used to control the TFC step size. If any one of the conditions is fulfilled the TFC step size can be increased from the default TFC step size by the scheduler.

Cell Conditions:

Number of M users in the serving cell

If the number M is below a threshold value the TFC step size is increased.

Number of scheduled/transmitting users in the serving cell per Transmission Time Interval (TTI)

If the number of users are below a threshold value the TFC step size is increased.

Scheduling headroom, i.e. Raise over Thermal (RoT) target—Noise rise measurement If the scheduling headroom is above a threshold value the TFC step size is increased.

Number of simultaneously transmitting users each TTI

If the number of simultaneously transmitting users each TTI is below a threshold value the TFC step size is increased.

User Conditions:

Power Headroom Level

If the power headroom level is above a threshold value the TFC step size is increased.

Estimated intercell interference impact, e.g. as determined by the CQI

If an estimated intercell interference impact is below a threshold value the TFC step size is increased.

Soft Handover

If a user equipment is in soft handover the TFC step size is increased.

UE buffer level for example the amount of data in the transmission buffer

If the amount of data in the transmission buffer is above a threshold value the TFC step size is increased.

Thus, in accordance with the above, a user equipment that generates a low (absolute) output transmission power (for example because it is close to the radio base station) will not interfere with other user equipments and can therefore be allowed to increase the TFC step size at a higher rate than a user equipment generating a higher absolute) output transmission power. In addition when a user equipment is determined to have a low impact on other users the TFC step size can be increased at a higher rate.

Figure 2:
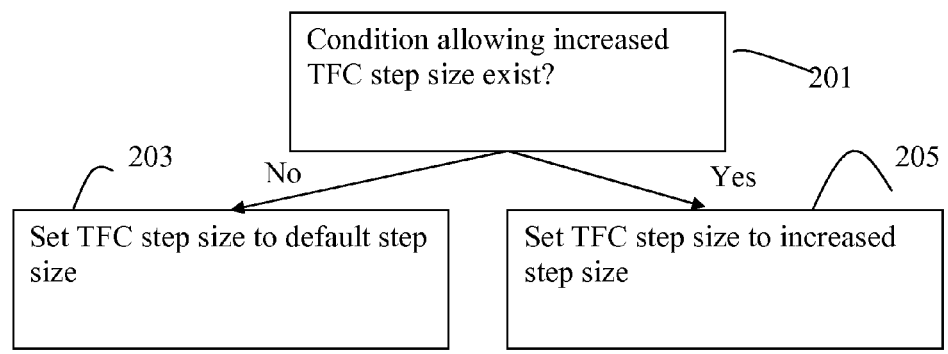
FIG. 2 is a flow chart illustrating some procedural steps performed when setting the TFC size step in a cellular radio system for a user.

In FIG. 2, some procedural steps performed in a scheduler 102 when setting the TFC step size in accordance with the above are depicted. First, in a step 201, it is checked if one or more predetermined conditions exist. The conditions can be any of the conditions listed above or another condition that is determined to allow changes in the grant at a rate which is dependent on the impact this will have on the rest of the network, e.g. a low power user equipment close to its serving NodeB will not generate a lot of interference, as a result, the scheduler, via the radio base station NodeB can order this user equipment to increase the TFC dramatically at an increased rate without having to worry about the effects. If the determination in step 201 is that no condition is fulfilled, the TFC size step is kept at a default level in a step 203. If, on the other hand, the determination in step 201 is that at least one condition is fulfilled, the TFC size step is set to an increase step size higher than the default level in a step 205. As a result, the TFC size step is set as a function of a number of pre-defined cell and/or user conditions.

The exact form of TFCStep(c,u) is implementation specific. As an example the following function can be used:

$$TFCStep(c,u) = f(M, ShedHdr, PwrHdr, CQI)$$

The procedure can be further refined by taking into account the total increase of TFC in a cell each scheduling instant. This will typically make the algorithm more stable and avoid exceeding the noise rise target. This can for example be implemented by applying the condition that the total TFC step for many users must be below a maximum step.

$$\Sigma TFCStep(c,u) < TFCStep_{Max}$$

I.e. the number of users can impact the step size so that step size is proportional to the number of users, implying that the noise rise increase is approximately constant irrespective of number of users in the system.

Note that if TFCStep is negative for some users, this allows higher total increase of the total TFCstep for the remaining users. An alternative solution is to omit the users with decreasing TFCs in the sum $\Sigma TFCStep(c,u)$.

Using the methods and devices as described herein will increase the user bit rate at low load. Specifically, the time to reach a high bitrate in low load situations is reduced. This leads to enhanced user experience for bursty services such as World Wide Web (WWW) services.

The invention claimed is:

1. A method of setting Transport Format Combination (TFC) step size utilizing a network-based scheduler of a cellular radio system, wherein the TFC step size is to be used by a user equipment transmitting data to a radio base station of the cellular radio system, the method comprising:
   determining, by the network-based scheduler, at least one of the following:
      that one or more pre-defined cell conditions exist in the cellular radio system, and
      that one or more pre-defined user conditions exist in the cellular radio system;
   based on the determination, increasing, by the network-based scheduler, the TFC step size at a variable rate that is a function of the one or more pre-defined cell conditions and/or the one or more pre-defined user conditions, wherein the variable rate is higher than a default rate of increase for the TFC step size, and wherein the increasing generates an increased TFC step size; and
   instructing, by the network-based scheduler, the user equipment to use the increased TFC step size when transmitting data to the radio base station.

2. The method according to claim 1, wherein the one or more pre-defined cell conditions include a cell-specific condition related to measurements and/or conditions in a serving cell in which the user equipment is served.

3. The method according to claim 2, wherein the cell-specific condition is one or more of:
   a first number of users in the serving cell;
   a second number of scheduled/transmitting users in the serving cell per Transmission Time Interval;
   scheduling headroom;
   noise rise measurement; and
   a third number of simultaneously transmitting users each Transmission Time Interval.

4. The method according to claim 3, wherein the third number of simultaneously transmitting users excludes users with negative or decreasing TFC step size.

5. The method according to claim 3, wherein the increasing the TFC step size includes one or more of the following:
   increasing, by the network-based scheduler, the TFC step size when the first number of users is below a first threshold value;
   increasing, by the network-based scheduler, the TFC step size when the second number of scheduled/transmitting users is below a second threshold value;
   increasing, by the network-based scheduler, the TFC step size when the scheduling headroom is above a third threshold value;
   increasing, by the network-based scheduler, the TFC step size when the noise rise measurement indicates that noise rise is below a fourth threshold value; and
   increasing, by the network-based scheduler, the TFC step size when the third number of simultaneously transmitting users is below a fifth threshold value.

6. The method according to claim 1, wherein the one or more pre-defined user conditions include a user-specific condition relating to measurements and/or conditions experienced by the user equipment.

7. The method according to claim 6, wherein the user-specific condition is one or more of:
   power headroom level;
   estimated intercell interference impact;
   status of soft handover; and
   user equipment buffer level.

8. The method according to claim 7, wherein the increasing the TFC step size includes one or more of the following:
   increasing, by the network-based scheduler, the TFC step size when the power headroom level is above a first threshold value;
   increasing, by the network-based scheduler, the TFC step size when the estimated intercell interference impact is below a second threshold value;
   increasing, by the network-based scheduler, the TFC step size when the status of soft handover indicates that the user equipment is in soft handover; and
   increasing, by the network-based scheduler, the TFC step size when the user equipment buffer level indicates an amount of data that is above a third threshold value.

9. A network-based scheduler for setting a Transport Format Combination (TFC) step size to be used by a user equipment transmitting data to a radio base station of a cellular radio system, the network-based scheduler comprising:
   a memory configured to store program instructions; and
   a processor configured to execute the program instructions, which, when executed by the processor, cause the network-based scheduler to perform the following:
   determine at least one of the following:
      that one or more pre-defined cell conditions exist in the cellular radio system, and
      that one or more pre-defined user conditions exist in the cellular radio system,
   based on the determination, increase the TFC step size at a variable rate that is a function of the one or more pre-defined cell conditions and/or the one or more pre-defined user conditions, wherein the variable rate is higher than a default rate of increase for the TFC step size, and wherein the increasing generates an increased TFC step size, and
   instruct the user equipment to use the increased TFC step size when transmitting data to the radio base station.

10. The scheduler according to claim 9, wherein the one or more pre-defined cell conditions include a cell-specific condition related to measurements and/or conditions in a serving cell in which the user equipment is served.

11. The scheduler according to claim 10, wherein the cell-specific condition is one or more of:
   a first number of users in the serving cell;
   a second number of scheduled/transmitting users in the serving cell per Transmission Time Interval;
   scheduling headroom;
   noise rise measurement; and
   a third number of simultaneously transmitting users each Transmission Time Interval.

12. The scheduler according to claim 11, wherein the third number of simultaneously transmitting users excludes users with negative or decreasing TFC step size.

13. The scheduler according to claim 11, wherein the program instructions, when executed by the processor, cause the network-based scheduler to increase the TFC step size under one or more of the following:
- when the first number of users is below a first threshold value;
- when the second number of scheduled/transmitting users is below a second threshold value;
- when the scheduling headroom is above a third threshold value;
- when the noise rise measurement indicates that noise rise is below a fourth threshold value; and
- when the third number of simultaneously transmitting users is below a fifth threshold value.

14. The scheduler according to claim 9, wherein the one or more pre-defined user conditions include a user-specific condition relating to measurements and/or conditions experienced by the user equipment.

15. The scheduler according to claim 14, wherein the user-specific condition is one or more of:
- power headroom level;
- estimated intercell interference impact;
- status of soft handover; and
- user equipment buffer level.

16. The scheduler according to claim 15, wherein the program instructions, when executed by the processor, cause the network-based scheduler to increase the TFC step size under one or more of the following:
- when the power headroom level is above a first threshold value;
- when the estimated intercell interference impact is below a second threshold value;
- when the status of soft handover indicates that the user equipment is in soft handover; and
- when the user equipment buffer level indicates an amount of data that is above a third threshold value.

* * * * *